(12) United States Patent
Song et al.

(10) Patent No.: US 11,990,655 B2
(45) Date of Patent: May 21, 2024

(54) FUEL CELL SYSTEM AND METHOD FOR CONTROLLING PURGE THEREOF

(71) Applicant: HYUNDAI MOBIS Co., Ltd., Seoul (KR)

(72) Inventors: Se Hoon Song, Yongin-si (KR); Sun Ho Lee, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 17/886,783

(22) Filed: Aug. 12, 2022

(65) Prior Publication Data
US 2023/0411656 A1 Dec. 21, 2023

(30) Foreign Application Priority Data
Jun. 17, 2022 (KR) .................. 10-2022-0074134

(51) Int. Cl.
| | |
|---|---|
| H01M 8/04 | (2016.01) |
| H01M 8/04089 | (2016.01) |
| H01M 8/04223 | (2016.01) |
| H01M 8/0438 | (2016.01) |
| H01M 8/04537 | (2016.01) |
| H01M 8/04746 | (2016.01) |

(52) U.S. Cl.
CPC ... *H01M 8/04753* (2013.01); *H01M 8/04089* (2013.01); *H01M 8/04231* (2013.01); *H01M 8/04395* (2013.01); *H01M 8/04559* (2013.01); *H01M 8/04589* (2013.01); *H01M 8/04619* (2013.01)

(58) Field of Classification Search
CPC ......... H01M 8/04753; H01M 8/04089; H01M 8/04231
See application file for complete search history.

(56) References Cited

U.S. PATENT DOCUMENTS

2021/0135259 A1* 5/2021 Park .................. H01M 8/04955

FOREIGN PATENT DOCUMENTS

| CN | 105594041 A | 5/2016 |
|---|---|---|
| CN | 113540535 A | 10/2021 |
| KR | 10-1616201 B1 | 4/2016 |

OTHER PUBLICATIONS

Frano Babir: "3. Fuel Cell Electrochemistry" In: "PEM Fuel Cells" Jan. 1, 2005 (Jan. 1, 2005), Academix press, XP93078062, ISBN: 978-0-12-078142-3 pp. 33-72, DOI: http://doi.org/10.1016/B978-0-12-078142-3.X5000-9, Retrieved from the Internet: URL:https://www.sciencedirect.com/book/9780120781423/pem-fuel-cells> *paragraph [03.6]*.
Extended European search report dated Oct. 24, 2023 issued for the corresponding European Patent Application No. 22191016.9.

(Continued)

*Primary Examiner* — Olatunji A Godo
(74) *Attorney, Agent, or Firm* — MORGAN, LEWIS & BOCKIUS LLP

(57) ABSTRACT

A fuel cell system includes a purge valve that discharges hydrogen on a hydrogen supply line passing a fuel cell stack, an operation state monitoring device that monitors an operation state of the fuel cell stack, and a controller that determines a purge frequency based on the operation state and controls the purge valve with reference to the determined purge frequency.

16 Claims, 7 Drawing Sheets

(56) References Cited

OTHER PUBLICATIONS

Extended European Search Report issued in corresponding European Patent Application No. 22191016.9 dated Oct. 24, 2023.
Frano Babir, "Chapter 3. Fuel Cell Electrochemistry", PEM Fuel Cells: Theory and Practice, Jan. 1, 2005 (Jan. 1, 2005), Academix press, XP93078062, ISBN: 978-0-12-078142-3 pp. 33-72, DOI: http://doi.org/10.1016/B978-0-12-078142-3.X5000-9, Retrieved from the Internet: URL:https://www.sciencedirect.com/book/9780120781423/pem-fuel-cells> *paragraph [03.6]*.

* cited by examiner

FUEL CELL SYSTEM AND METHOD FOR CONTROLLING PURGE THEREOF

CROSS-REFERENCE TO RELATED APPLICATION

This application claims the benefit of priority to Korean Patent Application No. 10-2022-0074134, filed in the Korean Intellectual Property Office on Jun. 17, 2022, the entire contents of which are incorporated herein by reference.

TECHNICAL FIELD

The present disclosure relates to a fuel cell system, and a method for controlling purge thereof.

BACKGROUND

A fuel cell system may generate electric energy by using a fuel cell stack. For example, when hydrogen is used as a fuel of the fuel cell stack, it may be a measure of solving global environmental problems, and thus researches and developments on fuel cell systems have been continuously made.

The fuel cell system may include a fuel cell stack that generates electric energy, a fuel supply device that supplies a fuel (hydrogen) to the fuel cell stack, an air supply device that supplies oxygen in air, which is an oxidizer that is necessary for an electrochemical reaction to the fuel cell stack, a thermal management system (TMS) that performs a water management function while removing reaction heat of the fuel cell stack to an outside and controlling an operation temperature of the fuel cell stack, and a fuel cell system controller that controls an overall operation of the fuel cell system.

The fuel cell system generates electricity by bringing hydrogen that is the fuel and oxygen in air into reaction with each other in the fuel cell stack, and discharges heat and water as reaction by-products. In the fuel cell system, because a cross-over occurs due to a difference between concentrations of gases in a hydrogen electrode and an air electrode in the fuel cell stack, hydrogen gas in the hydrogen electrode is diffused to the air electrode whereby the concentration of hydrogen in the hydrogen electrode is degraded and thus voltages of cells of the fuel cell stack decrease. To achieve this, the fuel cell system discharges residual hydrogen through purge of hydrogen to maintain the concentration of hydrogen in the hydrogen electrode in a specific range.

However, conventionally, because hydrogen is discharged during purge of hydrogen, hydrogen is contained in exhaust gas, whereby safety may be degraded and fuel efficiency may be degraded. To achieve this, the purge frequency is adjusted in consideration of an efficiency of the fuel or a content of hydrogen in the exhaust gas, but an amount of a fluid discharged at the same purge frequency is changed due to aging of a purge valve or an increase of a differential pressure, and thus it is difficult to constantly maintain a performance and an efficiency of the fuel cell.

SUMMARY

The present disclosure has been made to solve the above-mentioned problems occurring in the prior art while advantages achieved by the prior art are maintained intact.

An aspect of the present disclosure provides a fuel cell system that enhances a power generation efficiency of a fuel cell by adjusting a purge frequency according to changes in a power generation efficiency and a voltage of a fuel cell during purge, and a method for controlling purge thereof.

Another aspect of the present disclosure provides a fuel cell system that searches for a purge frequency having a maximum efficiency while increasing or decreasing a purge frequency in unit of a unit time when a power generation efficiency of a fuel cell is decreased during an operation thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a fuel cell system includes a purge valve that discharges hydrogen on a hydrogen supply line that passes a fuel cell stack, an operation state monitoring device that monitors an operation state of the fuel cell stack, and a controller that determines a purge frequency based on the operation state, and controls the purge valve with reference to the determined purge frequency.

In an embodiment, the operation state monitoring device may monitor at least one of a current, a voltage, a power generation efficiency, or a hydrogen supply amount of the fuel cell stack, or a combination thereof.

In an embodiment, the operation state monitoring device may monitor the operation state based on an average value for the operation state.

In an embodiment, the controller may determine a first purge frequency, at which the power generation efficiency of the fuel cell stack reaches a maximum efficiency point.

In an embodiment, the controller may search for a second purge frequency, at which a changed maximum efficiency point is reached, while the purge frequency is adjusted in unit of a specific time period, when the maximum efficiency point for the power generation efficiency of the fuel cell stack is changed during an operation thereof.

In an embodiment, the controller may increase or decrease the purge frequency in unit of the specific time period, based on a change in an efficiency and a voltage of the fuel cell stack.

In an embodiment, the controller may increase the purge frequency when the power generation efficiency and the voltage of the fuel cell stack become higher than a power generation efficiency and a voltage of a previous time point.

In an embodiment, the controller may decrease the purge frequency when the voltage of the fuel cell stack becomes lower than that at the previous time point while the power generation efficiency of the fuel cell stack becomes higher than that at the previous time point.

In an embodiment, the controller may increase the purge frequency when the power generation efficiency and the voltage of the fuel cell stack become lower than a power generation efficiency and a voltage at a previous time point.

In an embodiment, the controller may decrease the purge frequency when the voltage of the fuel cell stack becomes higher than that at the previous time point while the power generation efficiency of the fuel cell stack becomes lower than that at the previous time point.

According to another aspect of the present disclosure, a method for controlling purge of a fuel cell system includes monitoring an operation state of a fuel cell stack, and determining a purge frequency based on the operation state, and controlling a purge valve that discharges hydrogen on a hydrogen supply line that passes the fuel cell stack with reference to the determined purge frequency.

In an embodiment, the monitoring of the operation state of the fuel cell stack may include monitoring at least one of a current, a voltage, a power generation efficiency, or a hydrogen supply amount of the fuel cell stack, or a combination thereof.

In an embodiment, the monitoring of the operation state of the fuel cell stack may include monitoring the operation state based on an average value for the operation state.

In an embodiment, the controlling of the purge valve may include determining a first purge frequency, at which the power generation efficiency of the fuel cell stack reaches a maximum efficiency point.

In an embodiment, the controlling of the purge valve may include searching for a second purge frequency, at which a changed maximum efficiency point is reached, while the purge frequency is adjusted in unit of a specific time period, when the maximum efficiency for the power generation efficiency of the fuel cell stack is changed during an operation thereof.

In an embodiment, the searching of the second purge frequency may include adjusting the purge frequency while increasing or decreasing the purge frequency in unit of the specific time period based on a change in an efficiency and a voltage of the fuel cell stack.

In an embodiment, the adjusting of the purge frequency may include increasing the purge frequency when the power generation efficiency and the voltage of the fuel cell stack become higher than a power generation efficiency and a voltage of a previous time point.

In an embodiment, the adjusting of the purge frequency may include decreasing the purge frequency when the voltage of the fuel cell stack becomes lower than that at the previous time point while the power generation efficiency of the fuel cell stack becomes higher than that at the previous time point.

In an embodiment, the adjusting of the purge frequency may include increasing the purge frequency when the power generation efficiency and the voltage of the fuel cell stack become lower than a power generation efficiency and a voltage at a previous time point.

In an embodiment, the adjusting of the purge frequency may include decreasing the purge frequency when the voltage of the fuel cell stack becomes higher than that at the previous time point while the power generation efficiency of the fuel cell stack becomes lower than that at the previous time point.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
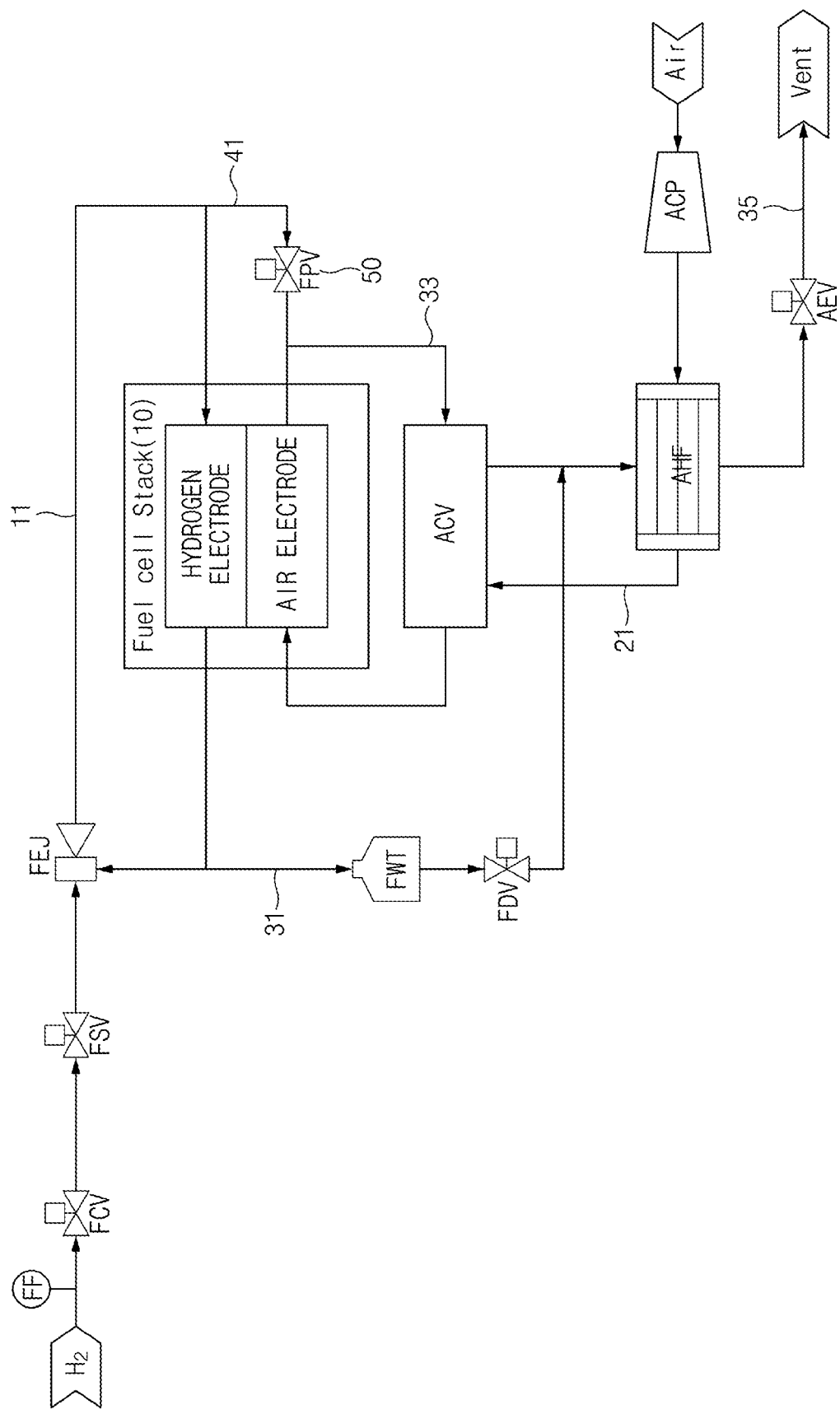
FIG. 1 is a view illustrating a fuel cell system according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These teams are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a view illustrating a fuel cell system according to an embodiment of the present disclosure.

Referring to FIG. 1, a fuel cell system includes a fuel cell stack 10, and may further include a hydrogen supply line 11 connected to a hydrogen electrode of the fuel cell stack 10 and through which hydrogen supplied to the fuel cell stack 10 flows, an air supply line 21 connected to an air electrode of the fuel cell stack 10 and through which air supplied to the fuel cell stack 10 flows, and discharge lines 31, 33, and 35 and a purge line 41 for discharging moisture (water), non-reaction gases, and the like that are reaction by-products.

The fuel cell stack 10 (or may be referred to as a 'fuel cell') may have a structure, in which electricity may be produced through an oxidation/reduction reaction of a fuel (for example, hydrogen) and an oxidizer (for example, air).

As an example, the fuel cell stack 10 may include a membrane electrode assembly (MEA), in which catalyst electrode layers, in which electrochemical reactions occur, are attached to opposite sides of a membrane with respect to an electrolyte membrane, through which hydrogen ions flow, a gas diffusion layer (GDL) that functions to uniformly distribute reaction gases and deliver generated electric energy, a gasket and a fastening device for maintaining a sealing performance of the reaction gases and cooling water and a proper fastening pressure, and a bipolar plate, through which the reaction gases and the cooling water flow.

In the fuel cell stack 10, the hydrogen that is the fuel and the air (oxygen) that is the oxidizer are supplied to an anode and a cathode of the membrane electrode assembly through the bipolar plate, and the hydrogen may be supplied to the anode that is the hydrogen electrode and the air may be supplied to the cathode that is the air electrode.

The hydrogen supplied to the anode is decomposed into protons and electrons by a catalyst of the electrode layers provided on opposite sides of the electrolyte membrane, and among them, only the hydrogen ions may be delivered to the cathode after selectively passing the electrolyte membrane that is a cation exchange membrane, and at the same time, the electrons may be delivered to the cathode through the gas diffusion layer and the bipolar plate. In the cathode, the hydrogen ions supplied through the electrolyte membrane and the electrons delivered through the bipolar plate may meet oxygen in the air supplied to the cathode by an air supply device and may generate a reaction of generating water. Then, the electrons may flow through an external wire due to the flows of the hydrogen ions, and electric currents may be generated due to the flows of the electrons.

A fuel flow rate sensor FF, a fuel cut-off valve FCV, a fuel supply valve FSV, a fuel ejector FEJ, and the like may be disposed in the hydrogen supply line 11. The hydrogen supply line 11 may be connected to a hydrogen tank.

The fuel flow rate sensor FF is a sensor that measures a flow rate of hydrogen supplied from the hydrogen tank to the fuel cell stack 10.

The fuel cut-off valve FCV is disposed between the hydrogen tank and the fuel supply valve FSV in the hydrogen supply line 11, and functions to interrupt hydrogen discharged from the hydrogen tank from being supplied to the fuel cell stack 10. The fuel cut-off valve FCV may be controlled to be opened in a start-on state of the fuel cell system, and to be closed in a start-off state thereof.

The fuel supply valve FSV is disposed between the fuel cut-off valve FCV and the fuel ejector FEJ in the hydrogen supply line 11, and functions to adjust a pressure of the hydrogen supplied to the fuel cell stack 10. As an example, the fuel supply valve FSV may be controlled to be opened to supply the hydrogen when a pressure in the hydrogen supply line 11 is decreased, and to be closed when the pressure in the hydrogen supply line 11 is increased.

The fuel ejector FEJ is disposed between the fuel supply valve FSV and the fuel cell stack 10 in the hydrogen supply line 11, and functions to supply the hydrogen that passes through the fuel supply valve FSV by applying a pressure to the fuel cell stack 10.

The hydrogen supply line 11 may define a circulation route for hydrogen by connecting an outlet of the fuel cell stack and the fuel ejector FEJ. Accordingly, the hydrogen discharged by the fuel ejector FEJ may generate electric energy while reacting with air in the fuel cell stack 10, and the hydrogen that does not react may be disposed through an outlet of the fuel cell stack 10 to be reintroduced into the fuel ejector FEJ. In this case, the hydrogen that does not react may be reintroduced into the fuel ejector FEJ to be supplied to the fuel cell stack 10 again so as to enhance a reaction efficiency of the hydrogen.

In a process of recirculating the hydrogen that does not react in the hydrogen electrode of the fuel cell stack 10, moisture that is present in the hydrogen supply line 11 may be condensed. Then, the condensed water (condensate) may be discharged through the first discharge line 31 that connects one point on the hydrogen supply line 11, through which the hydrogen that does not react in the hydrogen electrode of the fuel cell stack 10 flows to the fuel ejector FEJ, and an air humidifier AHF.

A fuel water trap FWT and a fuel drain valve FDV may be disposed on the first discharge line 31.

The fuel water trap FWT functions to store the condensate that is introduced to the first discharge line 31 at one point of the hydrogen supply line 11.

The fuel drain valve FDV functions to discharge the condensate stored in the fuel water trap FWT to the air humidifier AHF along the first discharge line 31. Here, the fuel drain valve FDV may be controlled to be closed until the condensate stored in the fuel water trap FWT exceeds a specific water level and to be opened when the condensate stored in the fuel water trap FWT exceeds the specific water level such that the condensate is discharged through the first discharge line 31.

An air compressor ACP, the air humidifier AHF, an air cut-off valve ACV, and the like may be disposed in the air supply line 21.

The air compressor ACP is disposed between an air suction hole, through which ambient air is suctioned from the air supply line 21 and the air humidifier AHF, and functions to suction and compress the ambient air and supply compressed air.

The air humidifier AHF is disposed between the air compressor ACP and the air cut-off valve ACV in the air supply line 21, and functions to adjust a humidity of the air suctioned and compressed by the air compressor ACP and supply the air to the air electrode of the fuel cell stack 10. When the air compressed by the air compressor ACP is introduced through an inlet of the air humidifier AHF, moisture may be supplied to the introduced air to adjust the humidity. As an example, the air humidifier AHF may humidify the air supplied from the air compressor ACP by using the condensate introduced through the first discharge line 31 and the moisture contained in the air discharged through the second discharge line 33 that connects the air electrode of the fuel cell stack 10 and the air humidifier AHF.

The air humidifier AHF may be connected to the first discharge line 31. Accordingly, the air humidifier AHF may supply the moisture to the air supplied from the air compressor ACP by using the condensate introduced through the first discharge line 31.

Furthermore, the air humidifier AHF may be connected to an air outlet of the fuel cell stack 10 through the second discharge line 33, and the air discharged from the air electrode of the fuel cell stack 10 may be introduced into the air humidifier AHF through the second discharge line 33. Here, because the air discharged from the air electrode of the fuel cell stack 10 contains moisture, the air humidifier AHF performs humidification through exchange of moisture between the air discharged from the air electrode of the fuel cell stack 10 and the air supplied from the air compressor ACP. In this way, the air, to which moisture is supplied by the air humidifier AHF, is introduced into the air electrode of the fuel cell stack 10 to react with hydrogen, and then generates water.

Meanwhile, the air humidifier AHF is connected to an external outlet through the third discharge line 35, and discharges the air introduced through the second discharge line 33 to an outside through the third discharge line 35. Then, an air exhaust valve AEV may be disposed in the third discharge line 35.

The air cut-off valve ACV may be disposed on the air supply line 21 that connects the fuel cell stack 10 and the air humidifier AHF, and may interrupt the hydrogen discharged from the air humidifier AHF from being supplied to the air electrode of the fuel cell stack 10 or adjust a pressure of the air supplied to the air electrode of the fuel cell stack 10. As an example, the air cut-off valve ACV may be controlled to be opened in a start-on state of the fuel cell system, and to be closed in a start-off state thereof.

Furthermore, the air cut-off valve ACV may be connected to the second discharge line 33 that connects the fuel cell stack and the air humidifier AHF. The air cut-off valve ACV may interrupt the air discharged from the air electrode of the fuel cell stack 10 from being supplied to the air humidifier AHF through the second discharge line 33 or adjust the pressure of the air discharged from the air electrode of the fuel cell stack to the air humidifier AHF.

Although FIG. 1 illustrates that the air cut-off valve ACV is disposed in the air supply line 21 and the second discharge line 33 in an integrated manner, a first air cut-off valve (not illustrated) disposed on the air supply line 21 and a second air cut-off valve (not illustrated) disposed on the second discharge line 33 may be implemented in a separated manner.

Meanwhile, the purge line 41 may be connected to one point on the hydrogen supply line 11, through which the hydrogen supplied from the fuel ejector FEJ to the hydrogen electrode of the fuel cell stack 10 flows, and a fuel-line purge valve (FPV) 50 may be disposed on the purge line 41.

The purge valve (FPV) 50 is a valve that is opened and closed to manage concentrations of hydrogen of the fuel cell stack the hydrogen supply line 11, and the like, and functions to maintain the concentrations of the hydrogen in the fuel cell stack 10 and the hydrogen supply line 11 in a specific range.

The fuel cell stack 10 generates electric energy by using hydrogen and air, and the fuel-line purge valve (FPV) 50 is closed while the fuel cell stack 10 is operated in a normal state.

Here, the air supplied to the fuel cell stack 10 contains nitrogen in addition to oxygen, and a cross-over may occur due to a difference between partial pressures of nitrogen in the hydrogen electrode and the air electrode to decrease voltages of cells. Accordingly, the fuel-line purge valve (FPV) 50 may maintain a performance of the stack by discharging residual hydrogen to increase a concentration of hydrogen in the hydrogen electrode, and thus decrease a concentration of nitrogen. The fuel-line purge valve (FPV) 50 may be opened to purge hydrogen when a quantity of electric charges calculated by integrating current generated in the fuel cell stack 10 for a specific period of time exceeds a target quantity of electric charges, whereby the concentration of hydrogen in the hydrogen electrode may be controlled to be maintained at a specific value or more.

Figure 2:
FIG. 2 is a block diagram illustrating control of a fuel cell system according to an embodiment of the present disclosure.

FIG. 2 is a block diagram illustrating control of the fuel cell system according to an embodiment of the present disclosure.

Referring to FIG. 2, the fuel cell system may include an operation state monitoring device 110 and a controller 120.

The operation state monitoring device 110 may be a hardware device, such as a processor or a central processing unot (CPU), or a program implemented by the processor, and may monitor an operation state of the fuel cell system while the fuel cell system is operated.

As an example, the operation state monitoring device 110 may monitor a current, a voltage, and a power generation efficiency of the fuel cell stack 10. Furthermore, the operation state monitoring device 110 may monitor an amount of hydrogen and an amount of oxygen, which are necessary for reactions, an actually supplied hydrogen amount and an actually supplied air amount, a concentration of hydrogen in exhaust gas, and the like. Here, the operation state monitoring device 110 may monitor the states based on an average value of the operation state.

The controller 120 may be a hardware device, such as a processor or a central processing unit (CPU), or a program implemented by a processor. The controller 120 may be connected to the configurations of the fuel cell system to perform overall functions regarding management and operations of the fuel cell stack 10 of the fuel cell system. As an example, the controller 120 may be a fuel cell control unit (FCU) that controls the overall functions of the fuel cell system.

The controller 120 may determine the purge frequency, and may control the fuel-line purge valve (FPV) 50 based on the determined frequency. The controller 120 may determine a purge frequency, at which the power generation efficiency (hereinafter, will be referred to as 'an efficiency') of the fuel cell stack 10 reaches a maximum efficiency as an initial value (hereinafter, will be referred to as 'a first purge frequency'). The purge frequency refers to the number of purges per unit time period, and the first purge frequency, at which the efficiency of the fuel cell stack 10 reaches the maximum efficiency, may be a value that is set in advance. Here, the fact that the efficiency of the fuel cell stack 10 reaches the maximum efficiency may mean that the efficiency of the fuel cell stack 10 is a reference value or more or reaches a preset maximum value.

Figure 3A:
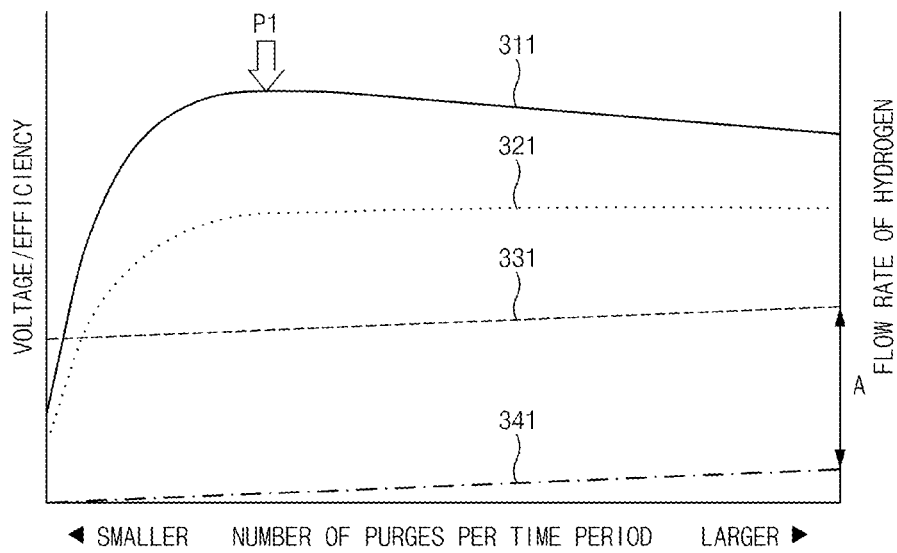
FIGS. 3A and 3B are views illustrating a change in a voltage and an efficiency of a fuel cell system according to a purge frequency according to an embodiment of the present disclosure.

A maximum efficiency point, at which the efficiency of the fuel cell stack 10 reaches the maximum efficiency during the operation of the fuel cell system may be indicated as in FIG. 3A.

FIG. 3A illustrates a graph that defines relationships between a voltage and the power generation efficiency of the fuel cell stack and the purge frequency and between a flow rate of hydrogen and the purge frequency when the fuel cell system is operated.

Referring to FIG. 3A, reference numeral 311 denotes a change in the efficiency of the fuel cell stack 10, reference numeral 321 denotes a change in the voltage of the fuel cell stack 10, reference numeral 331 denotes a change in the supplied hydrogen, and reference numeral 341 denotes a change in the hydrogen that does not react. Here, the amount of the hydrogen that is necessary for a reaction may be calculated by subtracting the amount of the hydrogen that does not react from the amount of the supplied hydrogen. Furthermore, the efficiency of the fuel cell stack 10 may be calculated based on a value obtained by dividing the output of the fuel cell stack 10 by the hydrogen supply amount.

Then, the efficiency of the fuel cell stack 10 has the highest value at point P1. Accordingly, the controller 120 may determine a purge frequency corresponding to point P1 as the first purge frequency.

Accordingly, the controller 120 may control the fuel-line purge valve (FPV) 50 based on the first purge frequency determined previously during the operation of the fuel cell system.

The operation state monitoring device 110 continuously monitors the operation state of the fuel cell system while the fuel-line purge valve (FPV) 50 is controlled, based on the first purge frequency during the operation of the fuel cell system.

During the operation of the fuel cell system, the operation state may be changed due to various factors, and accordingly, the purge frequency, at which the efficiency of the fuel cell stack 10 reaches the maximum efficiency, may be changed. As an example, membrane characteristics of the fuel cell stack 10 may be changed, amounts of nitrogen and vapor, which are crossed-over from the air electrode to the hydrogen electrode, may be changed, a purity of hydrogen may be changed, or an amount of fluid discharged at a preset purge frequency due to aging of the fuel-line purge valve (FPV) 50 or an increase in differential pressure, and thus the efficiency of the fuel cell stack 10 may become gradually lower. In this way, when the efficiency of the fuel cell stack 10 becomes lower, the purge frequency, at which the efficiency of the fuel cell stack 10 reaches the maximum frequency, may be changed.

Figure 3B:
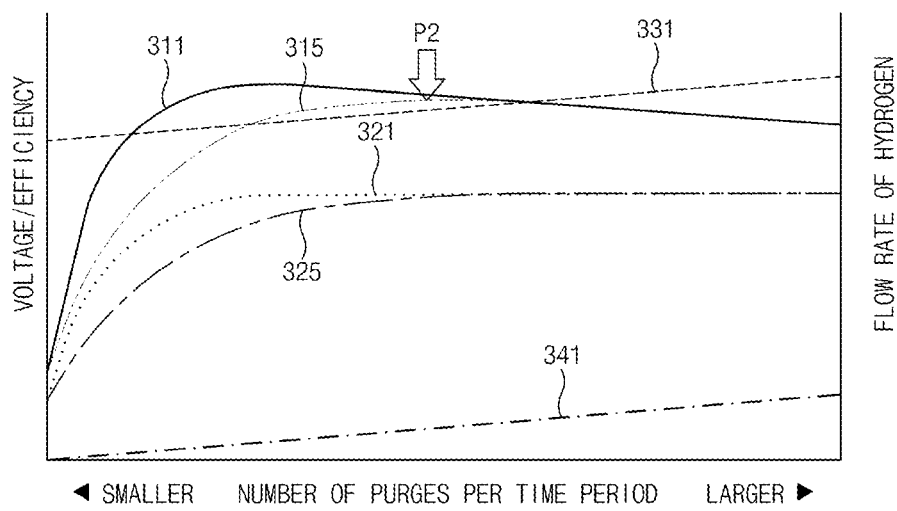

An embodiment, in which the point, at which the efficiency of the fuel cell stack 10 reaches the maximum efficiency as the operation state of the fuel cell system is changed, may be illustrated as in FIG. 3B.

FIG. 3B illustrates a graph that defines relationships between a voltage of the fuel cell stack and the power generation efficiency and between a flow rate of hydrogen and the purge frequency when the fuel cell system is operated.

Referring to FIG. 3B, reference numeral 311 denotes a change of the efficiency of the fuel cell stack 10 during a normal operation of the fuel cell system, and reference numeral 315 denotes a change in the efficiency changed according to a change in the operation state. Furthermore, reference numeral 321 denotes a change in the voltage of the fuel cell stack 10, and reference numeral 325 denotes a change in the voltage changed according to a change in the operation state. Furthermore, reference numeral 331 denotes a change in supplied hydrogen, and reference numeral 341 denotes a change in the hydrogen that does not react. Here, the amount of the hydrogen that is necessary for a reaction may be calculated by subtracting the amount of the hydrogen that does not react from the amount of the supplied hydrogen. Furthermore, the efficiency of the fuel cell stack 10 may be calculated based on a value obtained by dividing the output of the fuel cell stack 10 by the hydrogen supply amount.

Then, as in reference numeral 315, the changed efficiency of the fuel cell stack 10 has the highest value at point P2. In this way, when the point, at which the efficiency of the fuel cell stack 10 reaches the maximum efficiency, is changed from P1 to P2, the efficiency of the fuel cell stack 10 may become gradually lower when the controller 120 continuously performs purge control with reference to the purge frequency corresponding to point P1.

Accordingly, when determining that the efficiency becomes lower during the operation of the fuel cell system, the purge frequency may be adjusted based on the monitoring result of the operation state monitoring device 110. Then, when determining that the efficiency of the fuel cell stack 10 become lower, the controller 120 searches for the second purge frequency, at which the efficiency of the fuel cell stack 10 reaches the maximum efficiency while increasing or decreasing the purge frequency in unit of a reference time period based on changes in the voltage and the efficiency of the fuel cell stack 10.

The operation state monitoring device 110 continuously monitors the operation state of the fuel cell stack 10 while the controller 120 searches for the purge frequency. Accordingly, the controller 120 may determine whether to increase or decrease the purge frequency based on the operation state monitoring result during the searching of the purge frequency, for example, the voltage and the efficiency of the fuel cell stack 10.

Figure 4:
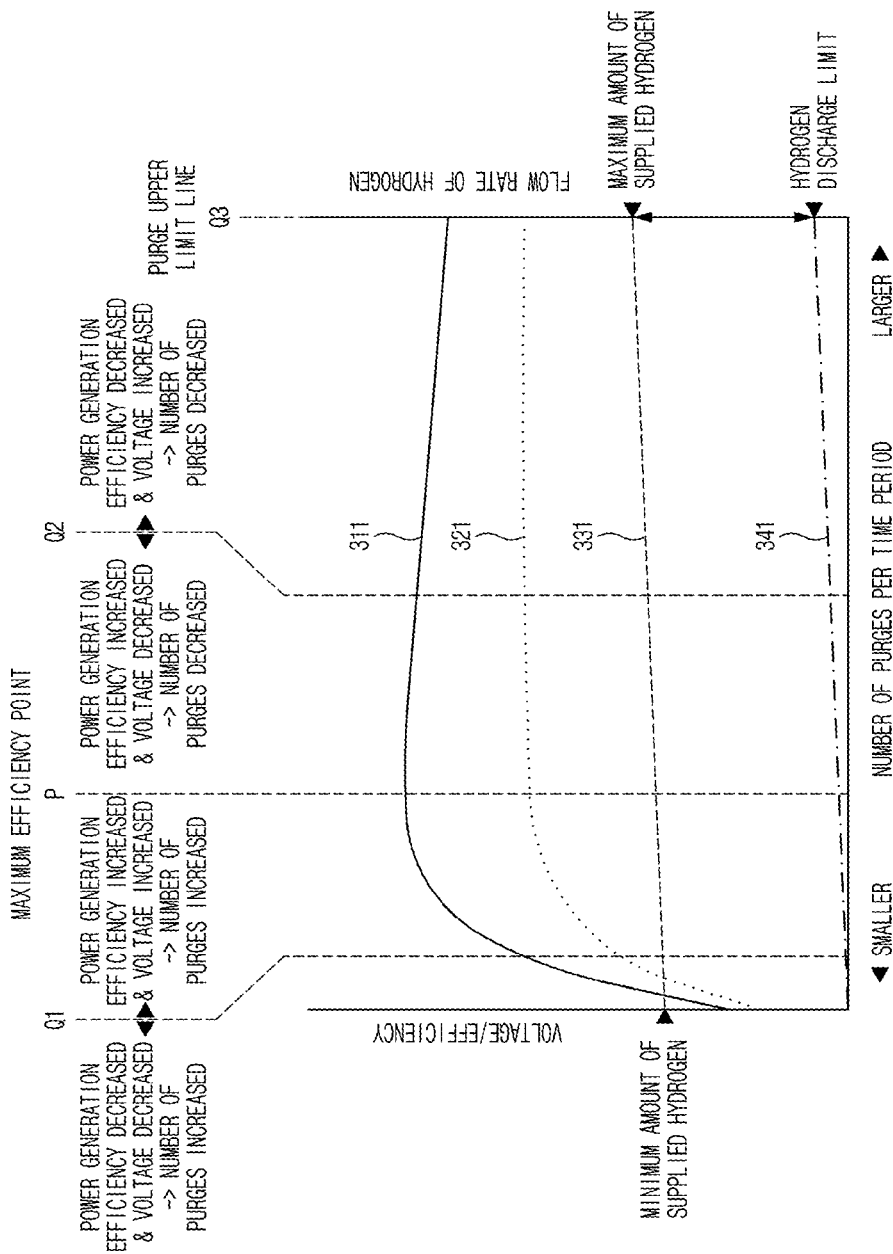
FIG. 4 is a view illustrating a purge frequency adjusting condition of a fuel cell system according to an embodiment of the present disclosure.

For an operation of determining whether to increase or decrease the purge frequency based on the voltage and the efficiency of the fuel cell stack 10, the embodiment of FIG. 4 will be referenced.

FIG. 4 is a view illustrating a purge frequency adjusting condition of the fuel cell system according to an embodiment of the present disclosure. Referring to FIG. 4, reference numeral 311 denotes a change in the efficiency of the fuel cell stack 10, reference numeral 321 denotes a change in the voltage of the fuel cell stack 10, reference numeral 331 denotes a change in the supplied hydrogen, and reference numeral 341 denotes a change in the hydrogen that does not react.

The controller 120 may calculate a minimum hydrogen supply amount and a maximum hydrogen supply amount based on the information on the operation state of the operation state monitoring device 110, and may perform purge control in consideration of the minimum hydrogen supply amount, the maximum hydrogen supply amount, and the like, which have been calculated.

Here, the minimum hydrogen supply amount is a minimum amount of hydrogen for outputting a target current during the operation of the fuel cell system, and Equation 1 as follows will be referenced for an equation for obtaining a minimum hydrogen supply amount.

$$H_{min} = \frac{I \times N_{cell}}{2 \times F} \qquad \text{[Equation 1]}$$

In Equation 1, $H_{min}$ denotes the minimum hydrogen supply amount, I denotes a stack current, $N_{cell}$ denotes the number of stacked cells in the stack, and F denotes the Faraday constant.

The maximum hydrogen supply amount may be calculated based on the concentration of hydrogen in exhaust gas. The concentration of hydrogen in the exhaust gas may be calculated by dividing the amount of the hydrogen that does not react by a value obtained by adding the amounts of the air that does not react and the hydrogen that does not react. Here, the amount of the hydrogen that does not react may be calculated by subtracting the amount of the hydrogen that reacts from the actual hydrogen supply amount. The actual hydrogen supply amount is obtained by compensating for the amount of the hydrogen discharged as purge in the minimum hydrogen supply amount. Furthermore, the amount of the air that does not react may be calculated by subtracting the amount of the oxygen that reacts from the amount of the supplied air.

The hydrogen supply amount when the concentration of the hydrogen in the exhaust gas reaches a hydrogen discharge limit value may be the maximum hydrogen supply amount. Accordingly, Equation 2 will be referenced for an equation for obtaining the maximum hydrogen supply amount.

$$H_{max} = \frac{I \times N_{cell}}{2 \times F} \times \frac{H_2' \times SR_{air} - xO_2 \times (3 \times H_2' - 2)}{2 \times xO_2 \times (1 - H_2')} \qquad \text{[Equation 2]}$$

In Equation 2, $H_{max}$ denotes the maximum hydrogen supply amount, I denotes the stack current, $N_{cell}$ denotes the number of stacked cells in the stack, F denotes the Faraday constant, $H_2'$ denotes the concentration of the hydrogen in the exhaust gas, $SR_{air}$ denotes a stoichiometric ratio of the air, and $xO_2$ denotes the concentration of oxygen in the air. Here, the stoichiometric ratio of the air may be determined in a design operation of the fuel cell stack 10 in advance. The hydrogen discharge limit value for the concentration of the hydrogen in the exhaust gas may be determined according to a factor of an environment, in which the fuel cell system is applied or installed, and/or rules.

As illustrated in FIG. 4, in one point Q1 of the section, in which the purge frequency is low, with respect to the maximum efficiency point of the efficiency, the voltage decreases while the efficiency decreases as it goes to the left side (in a direction, in which the purge frequency is low), and the voltage increases while the efficiency increases as it goes to the right side (in a direction, in which the purge frequency is high). Accordingly, the controller 120 determines that the current purge frequency corresponds to a low section with reference to the maximum efficiency point when the voltage decreases while the efficiency decreases or the voltage increases while the efficiency increases, and increases the purge frequency.

Meanwhile, in one point Q2 of the section, in which the purge frequency is high, with respect to the maximum efficiency point for the efficiency of the fuel cell stack 10, the voltage increases while the efficiency decreases as it goes to the right side (in a direction, in which the purge frequency is high), and the voltage decreases while the efficiency increases as it goes to the left side (in a direction, in which the purge frequency is low).

That is, because foreign substances are discharged more smoothly as the purge frequency increases in the corresponding section, the partial pressure of the hydrogen increases and thus the voltage of the fuel cell stack 10 increases, but because the hydrogen also is discharged together during the purge, the efficiency of the fuel cell stack 10 gradually decreases. Then, during the purge, a danger degree may increase as the concentration of the hydrogen contained in the discharged gas increases. Meanwhile, the efficiency of the fuel cell stack 10 increases because the discharge of the hydrogen is restrained as the purge frequency decreases in the corresponding section, but the partial pressure of the hydrogen decreases and thus the voltage of the fuel cell stack 10 decreases.

Accordingly, the controller 120 determines that the current purge frequency corresponds to a high section with reference to the maximum efficiency point when the voltage increases while the efficiency decreases or the voltage decreases while the efficiency increases, and decreases the purge frequency.

In this way, the controller 120 may search for the purge frequency corresponding to the maximum efficiency point while increasing or decreasing the purge frequency according to the change in the efficiency and the voltage.

The controller 120 may determine that the current purge frequency is the purge frequency corresponding to the maximum efficiency point when the efficiency of the current time point is maintained at the same efficiency as that of the previous time point, and may perform purge control while maintaining the purge frequency of the corresponding time point.

However, when the purge frequency continuously increases, the concentration of the hydrogen in the exhaust gas increases and thus a dangerous situation may occur. For this situation, the controller 120 adjusts the purge frequency in a range that does not exceed a purge upper limit line due to the maximum hydrogen supply amount.

Figure 5:
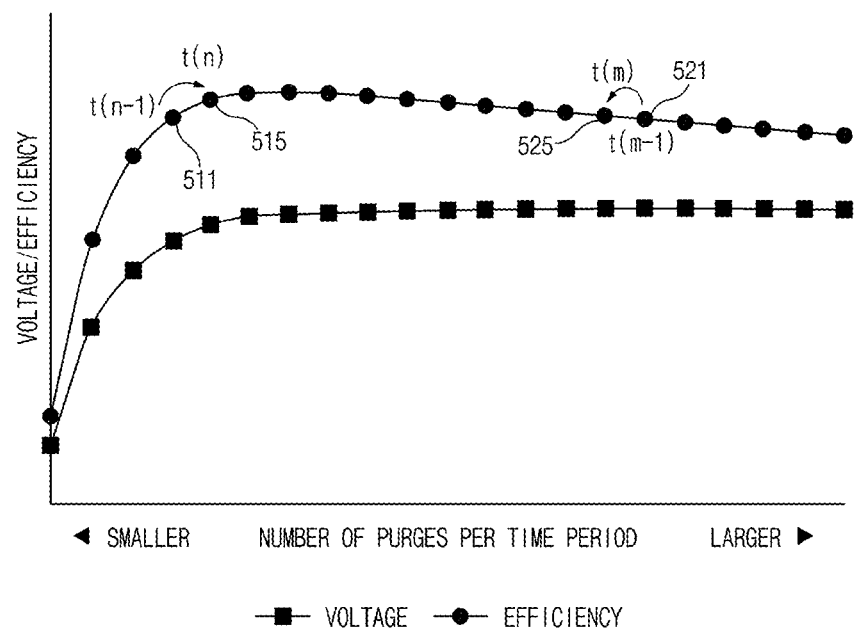
FIG. 5 is a view illustrating a purge frequency adjusting operation of a fuel cell system according to an embodiment of the present disclosure.

Accordingly, FIG. 5 will be referenced for the embodiment regarding the operation of searching for the purge frequency.

FIG. 5 is a view illustrating a purge frequency adjusting operation of the fuel cell system according to an embodiment of the present disclosure. Referring to FIG. 5, the controller 120 may perform purge control at the purge frequency corresponding to a point of reference numeral 511 at time point t(n-1). At this time, because the voltage increases as the efficiency of the fuel cell stack 10 increases, the controller 120 increases the purge frequency by a specific value (for example, by '1') according to a condition illustrated in FIG. 4.

Accordingly, the controller 120 performs purge control at the purge frequency corresponding to a point of reference numeral 515 at a later time point t(n). In this case, it may be identified that the efficiency at the point of reference numeral 515 is higher than the efficiency at the point of reference numeral 511 at the previous time point. Accordingly, the controller 120 may increase the purge frequency by a specific value (for example, by '1') in unit of a specific time period until the efficiency reaches the maximum efficiency point.

As another example, the controller 120 may perform purge control at the purge frequency corresponding to a point of reference numeral 521 at time point t(m-1). At this time, because the voltage increases as the efficiency of the fuel cell stack decreases, the controller 120 decreases the purge frequency by a specific value (for example, by '1') according to a condition illustrated in FIG. 4.

Accordingly, the controller 120 performs purge control at the purge frequency corresponding to a point of reference numeral 525 at a later time point t(m). In this case, it may be identified that the efficiency at the point of reference numeral 525 is higher than the efficiency at the point of reference numeral 521 at the previous time point.

Accordingly, the controller 120 may decrease the purge frequency by a specific value (for example, by '1') in unit of a specific time period until the efficiency reaches the maximum efficiency point.

In this way, the controller 120 may perform purge control with reference to the purge frequency when the efficiency reaches the maximum efficiency point during the operation of the fuel cell system, and may search for and adjust the purge frequency corresponding to the maximum efficiency point while increasing or decreasing the purge frequency based on the change in the efficiency and the voltage of the fuel cell stack 10 at the corresponding time point when the efficiency decreases during the operation of the fuel cell system to constantly maintain the performance of the fuel cell stack 10.

The operation flows of the fuel cell system according to the present disclosure, which is configured in this way, will be described in detail as follows.

Figure 6:
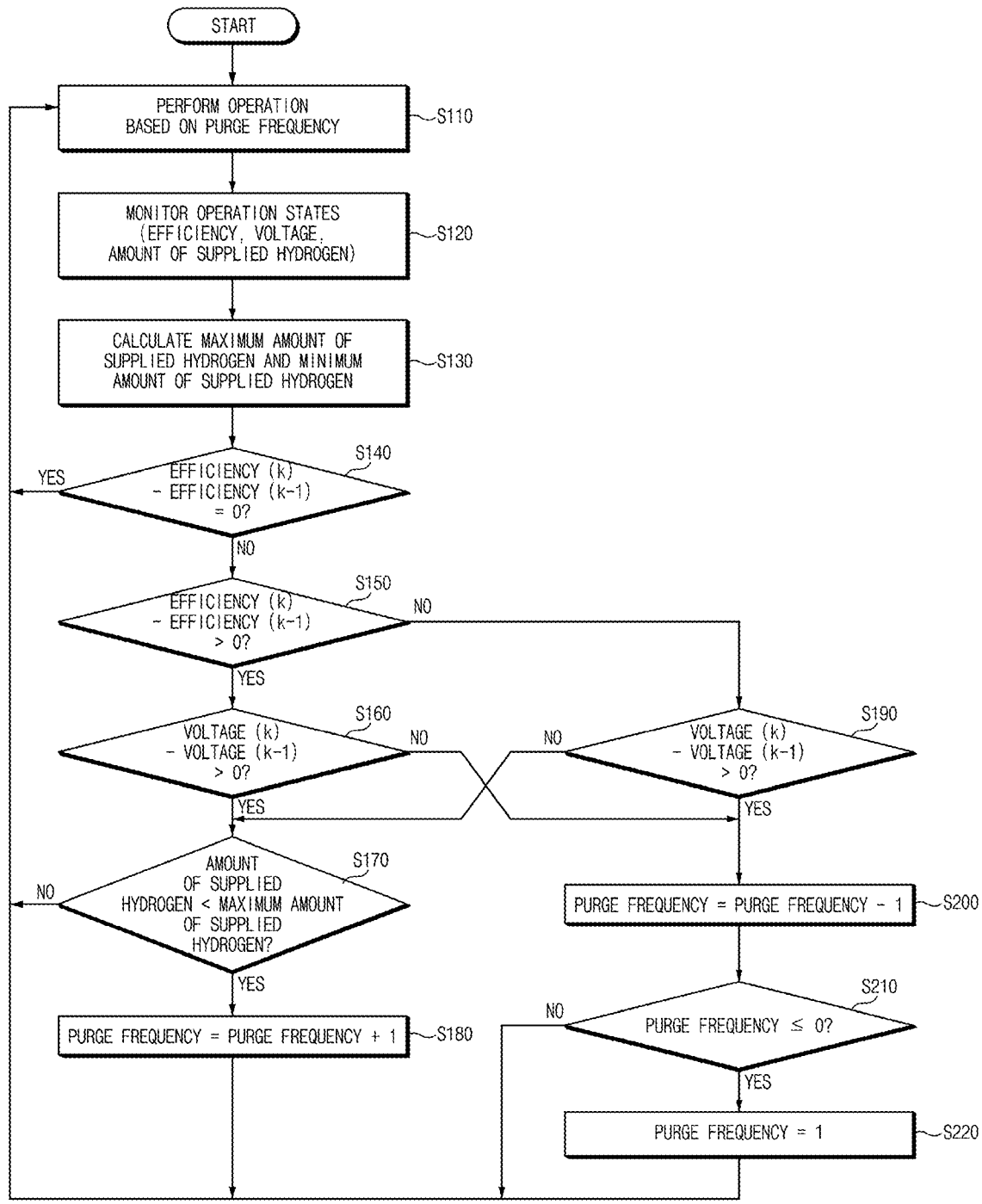
FIG. 6 is a view illustrating operation flows of a method for controlling purge of a fuel cell system according to an embodiment of the present disclosure.

FIG. 6 is a view illustrating operation flows of a method for controlling purge of the fuel cell system according to an embodiment of the present disclosure.

Referring to FIG. 6, the fuel cell system performs an operation in unit of a unit time based on a purge frequency set in advance (S110). Here, the purge frequency set in advance may be the first purge frequency, at which the efficiency of the fuel cell stack 10 reaches the maximum efficiency point. As another example, the first purge frequency may be a frequency, at which the efficiency of the fuel cell stack 10 becomes a reference value or more.

The fuel cell system monitors an operation state of the fuel cell system while being operated in process 'S110' (S120). In process 'S120', the fuel cell system may perform monitoring based on the average value for each of the operation states. As an example, the fuel cell system may monitor the states based on the average values of the efficiencies, the voltage, and/or the hydrogen supply amounts of the fuel cell stack 10.

The fuel cell system calculates the maximum hydrogen supply amount and the minimum hydrogen supply amount based on the operation state of process 'S120' (S130). Then, the fuel cell system may reflect the maximum hydrogen supply amount and the minimum hydrogen supply amount calculated in process 'S130' for the purge control.

During the operation of the fuel cell system, the maximum efficiency point may be changed due to various factors. When the maximum efficiency point is not changed, a difference between the efficiency 'k' identified in process 'S120' at the current time point and the efficiency (k-1) identified at the previous time point becomes 0. Accordingly, the fuel cell system performs purge control while repeating processes 'S110' to 'S140' when the difference between the efficiency 'k' identified in process 'S120' at the current time point and the efficiency (k-1) identified at the previous time point is 0.

Meanwhile, when the maximum efficiency point is changed by various factors during the operation of the fuel cell system, the efficiency during the operation based on the first purge frequency may not be the maximum efficiency. Accordingly, the fuel cell system determines that the maximum efficiency point is changed when the difference between the efficiency 'k' identified at the current time point and the efficiency (k-1) identified at the previous time point is not 0, and then, starts to search for the purge frequency. Then, the fuel cell system adjusts the purge frequency based on the change in the efficiency and the voltage of the fuel cell stack 10.

That is, the fuel cell system determines that the efficiency is increased when the difference between the efficiency 'k' identified at the current point and the efficiency (k-1) identified at the previous time point is larger than 0 (S150). Further, the fuel cell system determines that the voltage is increased when the difference between the voltage 'k' identified at the current time point and the voltage (k-1) identified at the previous time point is larger than 0 (S160).

Accordingly, the fuel cell system determines that the current purge frequency is lower than the purge frequency at the maximum efficiency point when the efficiency and the voltage increase, and increases the purge frequency in a range, in which the hydrogen supply amount is maintained at less than the maximum hydrogen supply amount (S170 and S180). As an example, in process 'S180', the fuel cell system increases the purge frequency by '1'. Thereafter, the fuel cell system may perform an operation for a unit time based on the purge frequency increased in process 'S180' while performing the processes after 'S110'. The fuel cell system monitors the operation state in real time while the operation is made in a state, in which the purge frequency is adjusted.

Meanwhile, the fuel cell system determines that the efficiency is increased when the difference between the efficiency 'k' identified at the current point and the efficiency (k-1) identified at the previous time point is larger than 0 in process 'S150'. Further, the fuel cell system determines that the voltage is decreased when the difference between the voltage 'k' identified at the current time point and the voltage (k-1) identified at the previous time point is not more than 0 (S160).

Accordingly, the fuel cell system determines that the purge frequency at the current time point is higher than the purge frequency at the maximum efficiency point when the voltage decreases while the efficiency increases, and decreases the purge frequency (S200). As an example, in process 'S200', the fuel cell system decreases the purge frequency by '1'. Meanwhile, when the purge frequency adjusted in process 'S200' is not more than 0 (S210), the purge frequency is maintained at '1' (S220). Thereafter, the fuel cell system may perform an operation for a unit time based on the purge frequency decreased in process 'S200' while performing the processes after 'S110'. The fuel cell system monitors the operation state in real time while the operation is made in a state, in which the purge frequency is adjusted.

As another example, the fuel cell system determines that the efficiency is decreased when the difference between the efficiency 'k' identified at the current point and the efficiency (k-1) identified at the previous time point is not more than 0 in process 'S150'.

Then, the fuel cell system determines that the voltage is decreased when the difference between the voltage 'k' identified at the current time point and the voltage (k-1) identified at the previous time point is not more than 0 (S190).

Accordingly, the fuel cell system determines that the current purge frequency is lower than the purge frequency at the maximum efficiency point when both the efficiency and the voltage decrease, and increases the purge frequency in a range, in which the hydrogen supply amount is maintained at less than the maximum hydrogen supply amount. As an example, in process 'S180', the fuel cell system increases the purge frequency by '1'. Thereafter, the fuel cell system may perform an operation for a unit time based on the increased purge frequency while performing the processes after 'S110'. The fuel cell system monitors the operation state in real time while the operation is made in a state, in which the purge frequency is adjusted.

Meanwhile, the fuel cell system determines that the efficiency is decreased when the difference between the efficiency 'k' identified at the current time point and the efficiency k-1 identified at the previous time point is not more than 0 in process 'S150', and determines that the voltage is increased when the difference between the efficiency 'k' identified at the current time point and the efficiency k-1 identified at the previous time point is larger than 0 in process 'S190'.

Accordingly, the fuel cell system determines that the purge frequency at the current time point is higher than the purge frequency at the maximum efficiency point when the voltage increases while the efficiency decreases, and decreases the purge frequency (S200). As an example, in process 'S200', the fuel cell system decreases the purge frequency by '1'. Meanwhile, when the purge frequency adjusted in process 'S200' is not more than 0 (S210), the purge frequency is maintained at '1' (S220). Thereafter, the fuel cell system may perform an operation for a unit time based on the purge frequency decreased in process 'S200' while performing the processes after 'S110'. The fuel cell system monitors the operation state in real time while the operation is made in a state, in which the purge frequency is adjusted.

In this way, the fuel cell system repeats processes 'S140' to 'S220' until the purge frequency reaches the purge frequency at the maximum efficiency point while increasing or decreasing the purge frequency.

The operating state monitoring device 110, the controller 120, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

As described above, according to the fuel cell and the method for controlling the fuel cell according to the present disclosure, the power generation efficiency of the fuel cell may be enhanced by adjusting the purge frequency according to the change in the power generation efficiency and the voltage of the fuel cell during the purge, and the purge frequency having the maximum efficiency may be searched for while the purge frequency is increased and decreased in unit of a unit time when the power generation efficiency of the fuel cell is decreased during the operation thereof.

According to an embodiment of the present disclosure, a power generation efficiency of a fuel cell may be enhanced by adjusting a purge frequency according to changes in a power generation efficiency and a voltage of a fuel cell during purge In addition, a purge frequency having a maximum efficiency may be searched for while increasing or decreasing a purge frequency in unit of a unit time when a power generation efficiency of a fuel cell is decreased during an operation thereof.

The above description is a simple exemplification of the technical spirits of the present disclosure, and the present disclosure may be variously corrected and modified by those skilled in the art to which the present disclosure pertains without departing from the essential features of the present disclosure.

Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:

1. A fuel cell system comprising:
a purge valve configured to discharge hydrogen on a hydrogen supply line that passes a fuel cell stack;
an operation state monitoring device configured to monitor an operation state of the fuel cell stack; and
a controller configured to determine a purge frequency based on the operation state, and to control the purge valve based on the determined purge frequency,
wherein the controller is further configured to:
determine a first purge frequency, at which the power generation efficiency of the fuel cell stack reaches a maximum efficiency point,
wherein the controller is further configured to:
search for a second purge frequency, at which a changed maximum efficiency point is reached, while the purge frequency is adjusted in unit of a specific time period, when the maximum efficiency point for the power generation efficiency of the fuel cell stack is changed to the changed maximum efficiency point during an operation thereof.

2. The fuel cell system of claim 1, wherein the operation state monitoring device is configured to:
monitor at least one of a current, a voltage, a power generation efficiency, or a hydrogen supply amount of the fuel cell stack, or a combination thereof.

3. The fuel cell system of claim 2, wherein the operation state monitoring device is further configured to:
monitor the operation state based on an average value for the operation state.

4. The fuel cell system of claim 1, wherein the controller is further configured to:
increase or decrease the purge frequency in unit of the specific time period, based on a change in the power generation efficiency and a change in a voltage of the fuel cell stack.

5. The fuel cell system of claim 4, wherein the controller is further configured to:
increase the purge frequency when the power generation efficiency and the voltage of the fuel cell stack become higher than a power generation efficiency and a voltage at a previous time point.

6. The fuel cell system of claim 4, wherein the controller is further configured to:
decrease the purge frequency when the voltage of the fuel cell stack becomes lower than that at a previous time point while the power generation efficiency of the fuel cell stack becomes higher than that at the previous time point.

7. The fuel cell system of claim 4, wherein the controller is further configured to:
increase the purge frequency when the power generation efficiency and the voltage of the fuel cell stack become lower than a power generation efficiency and a voltage at a previous time point.

8. The fuel cell system of claim 4, wherein the controller is further configured to:
decrease the purge frequency when the voltage of the fuel cell stack becomes higher than that at a previous time point while the power generation efficiency of the fuel cell stack becomes lower than that at the previous time point.

9. A method for controlling purge of a fuel cell system, the method comprising: monitoring an operation state of a fuel cell stack;
determining a purge frequency based on the operation state; and
controlling a purge valve based on the determined purge frequency, the purge valve being configured to discharge hydrogen on a hydrogen supply line that passes the fuel cell stack,
wherein the controlling of the purge valve includes:

determining a first purge frequency, at which the power generation efficiency of the fuel cell stack reaches a maximum efficiency point, wherein the controlling of the purge valve further includes:

searching for a second purge frequency, at which a changed maximum efficiency point is reached, while the purge frequency is adjusted in unit of a specific time period, when the maximum efficiency for the power generation efficiency of the fuel cell stack is changed to the changed maximum efficiency point during an operation thereof.

10. The method of claim 9, wherein the monitoring of the operation state of the fuel cell stack includes:

monitoring at least one of a current, a voltage, a power generation efficiency, or a hydrogen supply amount of the fuel cell stack, or a combination thereof.

11. The method of claim 10, wherein the monitoring of the operation state of the fuel cell stack further includes:

monitoring the operation state based on an average value for the operation state.

12. The method of claim 9, wherein the searching of the second purge frequency includes:

adjusting the purge frequency while increasing or decreasing the purge frequency in unit of the specific time period based on a change in the power generation efficiency and a change in a voltage of the fuel cell stack.

13. The method of claim 12, wherein the adjusting of the purge frequency includes:

increasing the purge frequency when the power generation efficiency and the voltage of the fuel cell stack become higher than a power generation efficiency and a voltage at a previous time point.

14. The method of claim 12, wherein the adjusting of the purge frequency includes:

decreasing the purge frequency when the voltage of the fuel cell stack becomes lower than that at a previous time point while the power generation efficiency of the fuel cell stack becomes higher than that at the previous time point.

15. The method of claim 12, wherein the adjusting of the purge frequency includes:

increasing the purge frequency when the power generation efficiency and the voltage of the fuel cell stack become lower than a power generation efficiency and a voltage at a previous time point.

16. The method of claim 12, wherein the adjusting of the purge frequency includes:

decreasing the purge frequency when the voltage of the fuel cell stack becomes higher than that at a previous time point while the power generation efficiency of the fuel cell stack becomes lower than that at the previous time point.

* * * * *